United States Patent
Fan et al.

(10) Patent No.: US 7,238,302 B2
(45) Date of Patent: Jul. 3, 2007

(54) SINGLE-COMPONENT, UV-EMITTING PHOSPHOR

(75) Inventors: Chen-Wen Fan, Sayre, PA (US); Thomas M. Snyder, Laceyville, PA (US); Eric A. Thomason, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 254 days.

(21) Appl. No.: 10/905,323

(22) Filed: Dec. 28, 2004

(65) Prior Publication Data

US 2006/0138387 A1 Jun. 29, 2006

(51) Int. Cl.
*C09K 11/81* (2006.01)
(52) U.S. Cl. ............................. 252/301.4 P
(58) Field of Classification Search .......... 252/301.4 P
See application file for complete search history.

(56) References Cited

U.S. PATENT DOCUMENTS 5,154,852 A * 10/1992 Chau .................... 252/301.4 P
5,961,882 A * 10/1999 Huguenin ............. 252/301.4 P
2004/0155570 A1   8/2004 Dutta et al. ................ 313/486

FOREIGN PATENT DOCUMENTS

WO   WO 2004/099341   * 11/2004

* cited by examiner

*Primary Examiner*—C. Melissa Koslow
(74) *Attorney, Agent, or Firm*—Robert F. Clark

(57) ABSTRACT

The present invention is a single-component, UV-emitting phosphor having a composition represented by the general formula $(Y_{1-x-y-z}La_xGd_yCe_z)PO_4$ where x has a value in a range from 0.001 to 0.98, y has a value in a range from 0 and 0.1, z has a value in a range from 0.01 and 0.2, and $x+y+z<1$. The phosphor when stimulated by 254 nm radiation emits in both the UVA and UVB regions. The relative balance of the UVA and UVB emissions may be varied by adjusting the relative amounts of Y and La. Brightness can be increased by adding Gd to the composition.

17 Claims, 3 Drawing Sheets

SINGLE-COMPONENT, UV-EMITTING PHOSPHOR

BACKGROUND OF THE INVENTION

Ultraviolet (UV)-emitting phosphors are used in fluorescent lamp applications for skin tanning where both UVA and UVB radiation is needed. UVA is defined by the U.S. Food & Drug Administration (FDA) as radiation from 320 nm to 400 nm and UVB is defined as radiation from 260 nm to 320 nm. A sensitive parameter for cosmetic, attractive tanning is the ratio of persistent (indirect) to immediate (direct) pigmentation of the skin. In general, UVA radiation mainly induces immediate pigmentation. This results in fast tanning and a grayish-brown color of the skin that disappears after a short time. On the other hand, UVB radiation promotes a long-lasting, reddish brown tanning of the skin. However, prolonged exposure to UVB radiation will also result in severe sunburn. Thus, the majority of the UV flux of tanning lamps is emitted in the UVA region with the balance in the UVB region. This is also intended to generally mimic the relative proportions of UVA and UVB in natural sunlight.

To provide fairly a good tan, a tanning lamp usually produces a controlled amount of UVB for melanogensis and an amount of UVA sufficient to induce immediate pigment darkening. In the present state of the art, this is achieved by blending different UVA- and UVB-emitting phosphors to yield a proper balance of UVA and UVB. The most common UVA-emitting phosphors include: $BaSi_2O_5$:Pb, $SrB_4O_7$:Eu, $YPO_4$:Ce, and (Ce,Mg)$BaAl_{11}O_{18}$:Ce. The main UVB-emitting phosphors include: $MgSrAl_{11}O_{17}$:Ce, $LaPO_4$:Ce, and $(Ca,Zn)_3(PO_4)_2$:Tl. The relative proportions of the individual phosphor constituents in the lamp depend upon emission efficiency of the individual phosphors and the desired UVA to UVB ratio. Unfortunately, because each UVA- and UVB-emitting phosphor will behave differently over the life of the lamp, the initially formulated UVB to UVA ratio can change over time. This means that the effectiveness of the tanning lamps may also vary over the life of a lamp. Thus, it would be an advantage to have a single-component, UV-emitting phosphor capable of producing a wide range of UVB to UVA ratios.

SUMMARY OF THE INVENTION

Phosphate phosphors generally achieve a higher maintenance level than silicate, borate, and aluminate phosphors in low-pressure, mercury vapor fluorescent lamps. There are three common cerium-activated orthophosphate phosphors including $YPO_4$:Ce, $LaPO_4$:Ce, and $GdPO_4$:Ce which all give a strong UV emission when excited by 254 nm radiation. These cerium-activated phosphates exhibit two crystal structures. $YPO_4$ is tetragonal with the xenotime structure whereas $LaPO_4$ and $GdPO_4$ are monoclinic and have monazite structure. Usually the emission of cerium-activated compounds consists of a broad band with two peaks in the ultraviolet region as the $Ce^{3+}$ ground state consists of a doublet ($^2F_{5/2}$ and $^2F_{7/2}$).

The $YPO_4$:Ce phosphor exhibits essentially all UVA emission with two main emission peaks occurring close to 334 and 354 nm while $LaPO_4$:Ce displays strong UVB emission with a major peak at 316 nm and a shoulder peak at 333 nm. The main emission peak of GdPO4:Ce is near 312 nm which is the typical emission found in all $Gd^{3+}$-containing phosphors. It has been discovered that a single-component, UV-emitting phosphor can be produced which has a UVB/UVA ratio that may be varied over a broad range. This is achieved by forming a solid solution of the cerium-activated orthophosphate phosphors within certain solubility limits. It is believed that this may be accomplished because of the relatively small differences between crystal ionic radii of $Y^{3+}$(0.093 nm), $La^{3+}$(0.106 nm), and $Gd^{3+}$(0.094 nm).

These and other objects of the invention are achieved in one embodiment where a single-component, UV-emitting phosphor is provided which has a composition represented by the general formula $(Y_{1-x-y-z}La_xGd_yCe_z)PO_4$ where x has a value in a range from 0.001 to 0.98, y has a value in a range from 0 and 0.1, z has a value in a range from 0.01 and 0.2, and x+y+z<1. More preferably, x has a value in a range from 0.001 and 0.4.

In accordance with another aspect of the invention, there is provided a method of making a single-component, UV-emitting phosphor comprising combining stoichiometric amounts of a phosphate source, a yttrium source, a lanthanum source, a gadolinium source, a cerium source, and a flux to form a mixture. Preferably, the flux is selected from a lithium-containing compound, a boron-containing compound, or a combination thereof. The lithium-containing compound is preferably lithium carbonate and the boron-containing compound is preferably boric acid. The mixture is then fired at a temperature and for a time sufficient to form the phosphor. Preferably, the mixture is fired in a reducing atmosphere such as a $H_2/N_2$ gas mixture.

In one alternative embodiment, the single-component, UV-emitting phosphor of this invention may be produced by a dry method from a mixture of the respective oxides of Y, La, Gd, and Ce, or compounds of Y, La, Gd, and Ce which are capable of being converted to oxides of Y, La, Gd, and Ce at a high temperature. These would include nitrates, sulfates, halides or hydroxides of Y, La, Gd, and Ce . The mixture further includes a flux and a phosphorus compound such as diammonium hydrogen phosphate, ammonium dihydrogen phosphate (MAP), or boron phosphate. The mixture may be fired in a single or multiple firing steps. Preferred conditions include firing for about 3 to about 10 hours at a temperature from about 800° C. to about 1400° C. in an inert gas (Ar or $N_2$) or a reducing atmosphere such as a nitrogen gas containing a small amount of hydrogen gas.

In another alternative embodiment, the single-component, UV-emitting phosphor of the present invention may be produced by a wet method wherein an aqueous solution containing Y, La, Gd, and Ce is reacted with a stoichiometric amount, or slight excess, of a phosphorus compound such as MAP in a pH-adjusted solution at the temperature from about 50° C. to about 90° C. to form a co-precipitate of mixed (Y, La, Gd, Ce) phosphate. The co-precipitate is then calcined at a temperature from about 500° C. to about 800° C. to obtain the co-precipitate mixed phosphate. A lithium-containing compound and/or a boron-containing compound may be added as a flux to the calcined co-precipitate and the mixture fired at a temperature from about 800° C. to about 1400° C. in an inert or a reducing atmosphere.

In a further alternative embodiment, the single-component, UV-emitting phosphor of this invention may also be synthesized from a mixed (Y, La, Gd, Ce) oxide co-precipitate. The starting materials are dissolved in a hot nitric acid to form a solution containing Y, La, Gd, and Ce. Oxalic acid or ammonia is added to form a co-precipitate of oxalates or hydroxides which are further calcined to obtain mixed co-precipitated oxides of Y, La, Gd, and Ce. This can then be combined with a phosphate source and a flux and fired to form the phosphor.

DETAILED DESCRIPTION OF THE INVENTION

Figure 1:
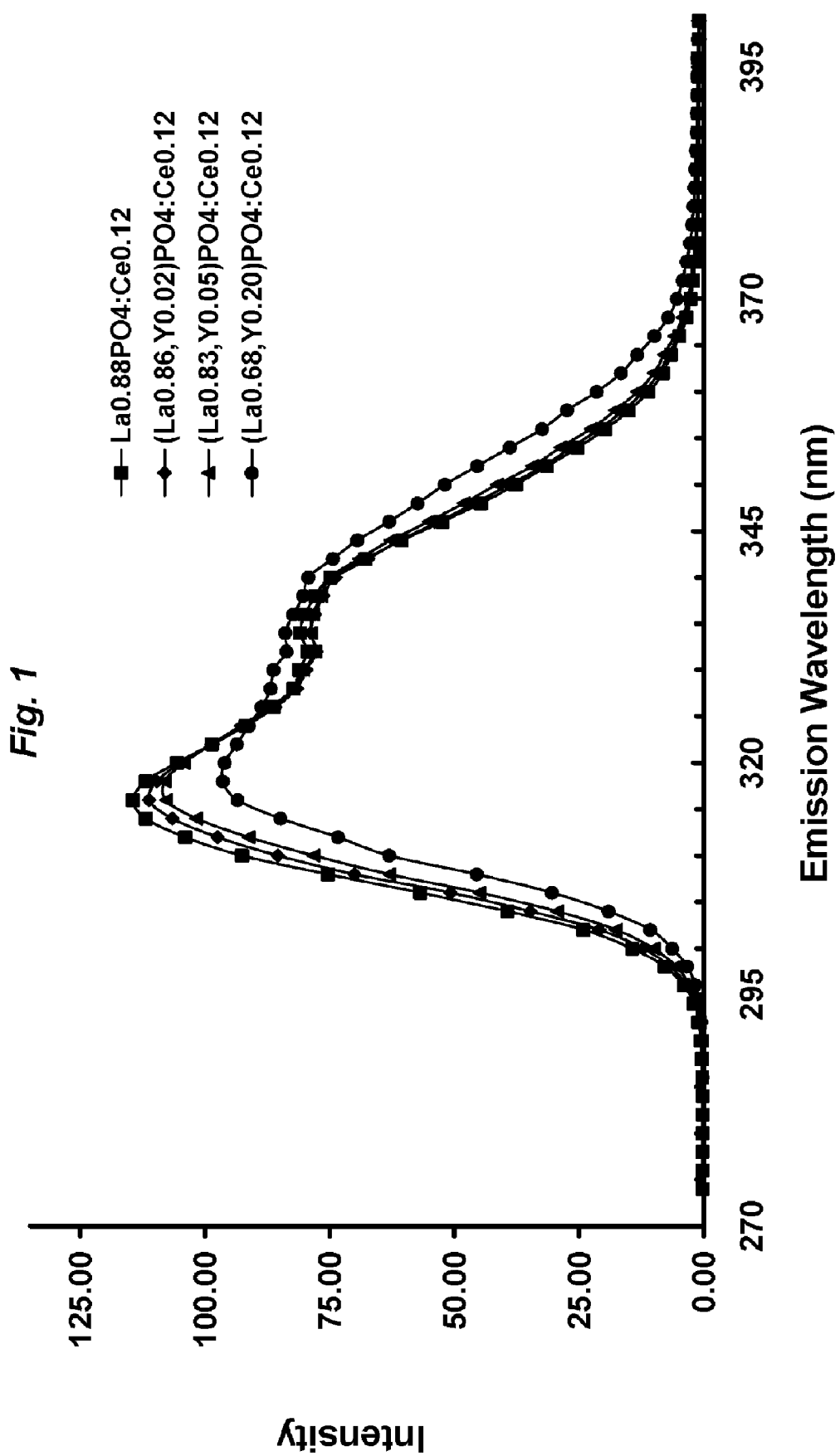
FIG. 1 are UV emission spectra of the phosphors in Example 1.

For a better understanding of the present invention, together with other and further objects, advantages and capabilities thereof, reference is made to the following disclosure and appended claims taken in conjunction with the above-described drawings.

The present invention is a single-component, UV-emitting phosphor having a composition represented by the general formula $(Y_{1-x-y-z}La_xGd_yCe_z)PO_4$ where x has a value in a range from 0.001 to 0.98, y has a value in a range from 0 and 0.1, z has a value in a range from 0.01 and 0.2, and x+y+z<1. The phosphor when stimulated by 254 nm radiation emits in both the UVA and UVB regions. The relative balance of the UVA and UVB emissions may be varied by adjusting the relative amounts of Y and La. Brightness can be increased by adding Gd to the composition. Since the phosphor is a phosphate, the UV-emitting phosphor is expected to have good brightness maintenance over the operating life of the lamp.

For tanning applications, the phosphor should have a UV emission exhibiting a UVB/UVA ratio in the range of 2 to 25% and, more preferably, from 3 to 10% when stimulated by 254 nm radiation. The preferred composition for the UV-emitting phosphor in this case is represented by the general formula $(Y_{1-x-y-z}La_xGd_yCe_z)PO_4$ where x has a value in a range from 0.001 to 0.4, y has a value in a range from 0 to 0.1, and z has a value in a range from 0.01 to 0.2, and x+y+z<0.5. More preferably, x has a value in a range from 0.01 to 0.2. In yet another embodiment, x+y+z has a value in a range from 0.05 to 0.25. The phosphor is a single-component phosphor in that each phosphor particle has substantially the same composition.

The present invention will be described in further detail with reference to the following examples. However, it should be understood that the present invention is by no means restricted to such specific examples.

EXAMPLE 1

Several phosphors were prepared with a general composition of $(La_{1-x-y-z}Y_xGd_yCe_z)PO_4$, where x=0, 0.02, 0.04, or 0.2, y=0, and z=0.12. In order to make the phosphate co-precipitate, 0.12 moles of $Ce(NO_3)_3 \cdot 6H_2O$, x/2 moles of $Y_2O_3$, and (0.88-x)/2 moles of $La_2O_3$ were dissolved in a dilute nitric acid solution at the temperature from 85 to 95° C. The cooled solution was then slowly added into 1.5 mole of a dilute MAP solution which was kept at a temperature from 40 to 60° C. and a pH from 1.0 to 1.4 for one hour to form co-precipitate phosphates of La, Y and Ce. After settling, the supernate was decanted and the phosphate was resuspended in cold water and agitated for 10 minutes. This procedure was repeated until the solution reached a pH of 2 or above. After a final decantation, the phosphate was placed in a drying oven at 65° C. for 12 hours. The dried phosphate was then calcined for 3 hours at 750° C. in air to obtain mixed phosphates of La, Y, and Ce. A 30.41 gram amount of the calcined phosphates was thoroughly mixed with 0.77 grams of lithium carbonate and 8.03 grams of boric acid. The mixture was then fired in a $N_2/H_2$ atmosphere in an alumina crucible at a temperature of 1200° C. for 3 hours in a $N_2/H_2$ atmosphere. The resulting phosphor was soaked in hot water for 1 hour, washed, filtered, dried, and sieved.

Phosphor samples were packed into plaques and excited by 254 nm radiation from a mercury discharge. The emission of each sample was measured from 270 to 400 nm (no significant UVB below 270 nm) and the areas under the UVA (320-400 nm) and the UVB (270-320 nm) regions calculated. The emission curves of these four phosphors are compared in FIG. 1. The main emission peak of $Ce^{3+}$ in lanthanum phosphate is located at 316 nm, whereas the secondary peak is overlapped with one peak of yttrium phosphate at 334 nm. With an increase in the $y^{3+}$ concentration, the 316 nm emission is suppressed, while the 334 nm emission intensifies. Also, the emission curves slightly shifted to higher wavelength as the $y^{3+}$ concentration increased. Although the total integrated area under emission curves exhibits little change, the ratio of UVB/UVA decreases steadily with increasing $y^{3+}$ m concentration. As used herein the term UVB/UVA ratio is defined as the integrated area under emission curve in the UVB region (270-320 nm) divided by the integrated area under the emission curve in the UVA region (320-400 NM) and multiplied by 100%, (Area UVB/Area UVA)×100%. The relative brightness and UVB/UVA ratio for these phosphors is given in Table 1.

TABLE 1

| Sample Lot | Brightness, % | UVB/UVA Ratio, % |
|---|---|---|
| $(La_{0.88},Y_{0.0})PO_4:Ce_{0.12}$ | 100 | 34.07 |
| $(La_{0.86},Y_{0.02})PO_4:Ce_{0.12}$ | 97.7 | 31.52 |
| $(La_{0.83},Y_{0.05})PO_4:Ce_{0.12}$ | 97.1 | 28.23 |
| $(La_{0.68},Y_{0.20})PO_4:Ce_{0.12}$ | 98.2 | 20.11 |

EXAMPLE 2

Several phosphors were prepared with a general composition of $(Y_{1-x-y-z}La_xGd_yCe_z)PO_4$, where x=0, 0.02, 0.1, 0.2, or 0.4, y=0, and z=0.04. These phosphors were prepared in the same manner as phosphors in Example 1 except that 0.04 mole of $Ce(NO_3)_3 \cdot 6H_2O$, x/2 mole of $La_2O_3$, and (0.96-x)//2 mole of $Y_2O_3$ were dissolved by an acid and an excess of MAP solution was added thereto to obtain co-precipitated phosphates of Y, La, and Ce. A 30.21 gram amount of the calcined phosphates was thoroughly mixed with 0.96 grams of lithium carbonate and 10.05 grams of boric acid and the mixture was fired and prepared as in Example 1.

Figure 2:
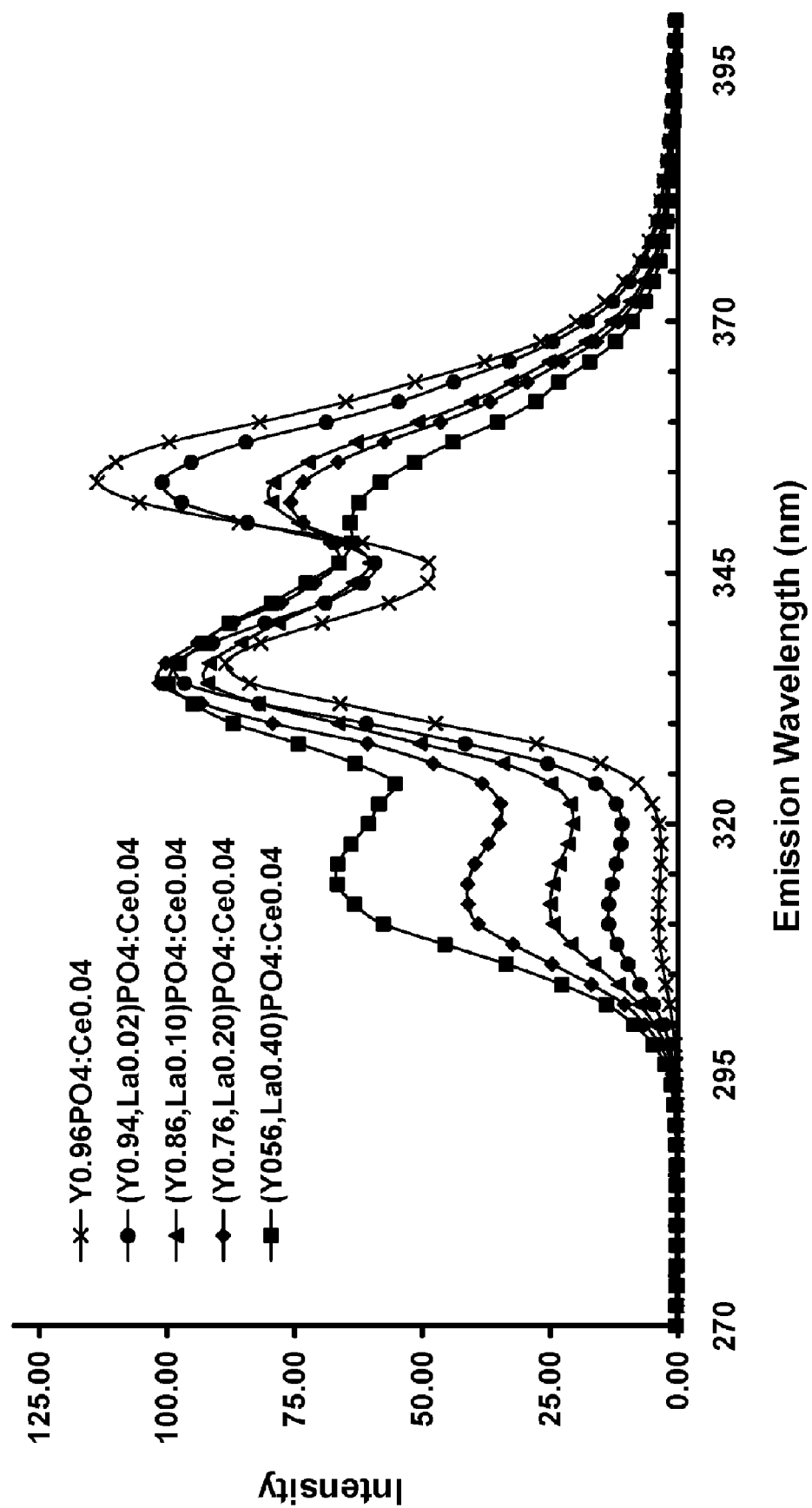
FIG. 2 are UV emission spectra of the phosphors in Example 2.

The emission spectra for these phosphors are shown in FIG. 2. With increasing $La^{3+}$ concentration, the 316 nm and 333 nm emissions intensify, whereas the 354 nm emission becomes weaker. The emission peak shifts slightly to shorter wavelengths with an increase in the $La^{3+}$ content. The emission intensity and the UVB/UVA ratio (Table 2) increase significantly when more of $Y^{3+}$ is replaced by $La^{3+}$. The XRD spectra of the phosphors show that a single-phase, mixed phosphate is formed. The XRD peak width becomes broader, but no new peaks form as the $La^{3+}$ substitution increases. In particular, the peak width increases from 0.16 degrees (2-theta) to 0.22 degrees (2-theta) and 0.24 degrees (2-theta) by increasing the $La^{3+}$ concentration from 0 to 0.02 and 0.05 moles, respectively. Based on the SEM/EDXA analysis, each phosphor particle contains the elements Y, La, Ce, and P which confirms that the composition of the phosphors prepared according to this invention are very homogeneous.

TABLE 2

| Phosphor Composition | Brightness, % | UVB/UVA Ratio, % |
|---|---|---|
| $(Y_{0.96}La_{0.0})PO_4:Ce_{0.04}$ | 100 | 1.68 |
| $(Y_{0.94}La_{0.02})PO_4:Ce_{0.04}$ | 103.1 | 5.03 |
| $(Y_{0.86}La_{0.10})PO_4:Ce_{0.04}$ | 107.3 | 8.90 |
| $(Y_{0.76}La_{0.20})PO_4:Ce_{0.04}$ | 115.3 | 13.20 |
| $(Y_{0.56}La_{0.40})PO_4:Ce_{0.04}$ | 122.7 | 18.88 |

EXAMPLE 3

Phosphors were prepared with a general composition of $(Y_{1-x-y-z}La_xGd_yCe_z)PO_4$, where x=0, or 0.05, y=0 or 0.05, and z=0.04. The phosphors were produced in the same manner as phosphors in Example 1, except that 0.04 mole of $Ce(NO_3)_3 \cdot 6H_2O$, x/2 mole of $La_2O_3$, y/2 mole of $Gd_2O_3$, and (0.96−x−y)/2 mole of $Y_2O_3$ were dissolved by an acid and an excess of MAP solution was added thereto to obtain co-precipitated phosphates of Y, La, Gd, and Ce. A 30.21 gram amount of the calcined phosphates was thoroughly mixed with 0.96 grams of lithium carbonate and 10.05 grams of boric acid and mixture was fired and prepared as in Example 1.

Figure 3:
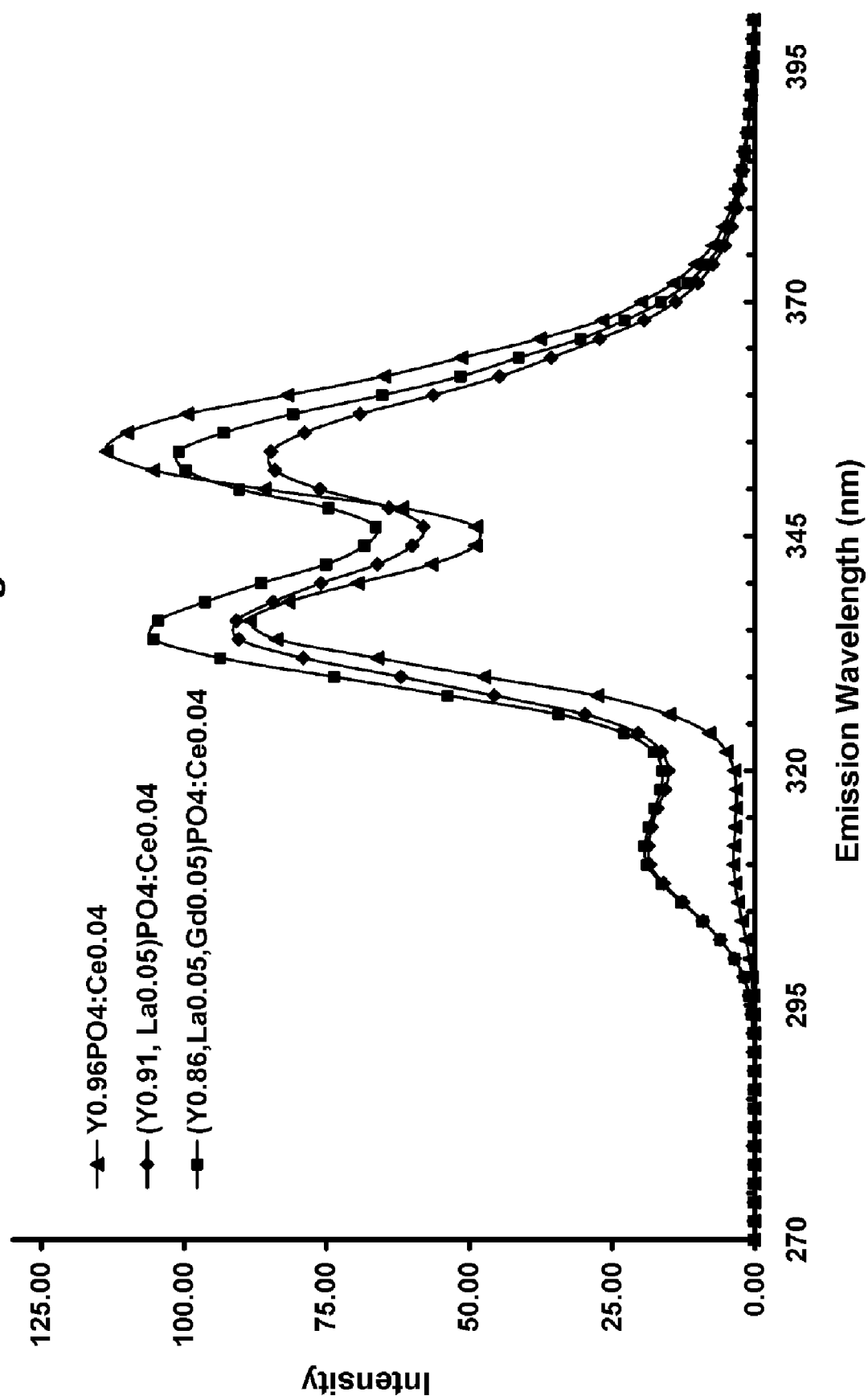
FIG. 3 are UV emission spectra of the phosphors in Example 3.

As seen by the spectra shown in FIG. 3, the emission peaks from these phosphors do not shift to longer wavelengths with increasing $Gd^{3+}$ concentration. However, the emission intensity increases significantly by substituting $Gd^{3+}$ into (Y, La, Ce)$PO_4$ matrix. Although the 316 nm emission remains the same, the 333 nm and 354 nm emissions intensify significantly. In addition, the UVB/UVA ratio in Table 3 shows little change with the Gd substitution.

TABLE 3

| Phosphor Composition | Brightness, % | UVB/UVA Ratio, % |
|---|---|---|
| $Y_{0.96}PO_4:Ce_{0.04}$ | 100 | 1.68 |
| $(Y_{0.91}La_{0.05})PO_4:Ce_{0.04}$ | 106.3 | 6.74 |
| $(Y_{0.86}La_{0.05},Gd_{0.05})PO_4:Ce_{0.04}$ | 117.6 | 6.52 |

While there has been shown and described what are at the present considered the preferred embodiments of the invention, it will be obvious to those skilled in the art that various changes and modifications may be made therein without departing from the scope of the invention as defined by the appended claims.

What is claimed is:

1. A single-component, UV-emitting phosphor having a composition represented by a general formula $(Y_{1-x-y-z}La_xGd_yCe_z)PO_4$ where x has a value in a range from 0.001 to 0.98, y has a value in a range from 0 to 0.1, z has a value in a range from 0.01 to 0.2, and x+y+z<1.

2. The single-component, UV-emitting phosphor of claim 1 wherein x has a value in a range from 0.001 to 0.4.

3. A single-component, UV-emitting phosphor having a composition represented by a general formula $(Y_{1-x-y-z}La_xGd_yCe_z)PO_4$ where x has a value in a range from 0.001 to 0.4, y has a value in a range from 0 to 0.1, and z has a value in a range from 0.01 to 0.2, and x+y+z<0.5.

4. The single-component, UV-emitting phosphor of claim 3 wherein x has a value in a range from 0.01 to 0.2.

5. The single-component, UV-emitting phosphor of claim 4 wherein x+y+z has a value in a range from 0.05 to 0.25.

6. A single-component, UV-emitting phosphor having a UVB/UVA ratio in a range from 2 and 25% when stimulated by 254 nm radiation.

7. The single-component, UV-emitting phosphor of claim 6 wherein the UVB/UVA ratio is from 3 to 10%.

8. The single-component, UV-emitting phosphor of claim 6 wherein the phosphor has a composition represented by a general formula $(Y_{1-x-y-z}La_xGd_yCe_z)PO_4$ where x has a value in a range from 0.001 to 0.4, y has a value in a range from 0 to 0.1, and z has a value in a range from 0.01 to 0.2, and x+y+z<0.5.

9. A method of making a single-component, UV-emitting phosphor having a composition represented by a general formula $(Y_{1-x-y-z}La_xGd_yCe_z)PO_4$ where x has a value in a range from 0.001 to 0.98, y has a value in a range from 0 to 0.1, z has a value in a range from 0.01 to 0.2, and x+y+z<1, the method comprising combining stoichiometric amounts of a phosphate source, a yttrium source, a lanthanum source, a gadolinium source, a cerium source, and a flux to form a mixture and firing the mixture to form the phosphor.

10. The method of claim 9 wherein the flux is selected from a lithium-containing compound, a boron-containing compound, or a combination thereof.

11. The method of claim 10 wherein the lithium-containing compound is lithium carbonate and the boron-containing compound is boric acid.

12. The method of claim 9 wherein the mixture is fired in a $H_2/N_2$ gas mixture.

13. The method of claim 9 wherein the yttrium source, the lanthanum source, the gadolinium source, and the cerium source comprise oxides of Y, La, Gd, and Ce, or compounds of Y, La, Gd, and Ce which are capable of being convened to oxides of Y, La, Gd, and Ce at a high temperature.

14. The method of claim 9 wherein the mixture is fired for about 3 to about 10 hours at a temperature from about 800° C. to about 1400° C. in an inert gas or a reducing atmosphere.

15. The method of claim 9 wherein the phosphate source, the yttrium source, the lanthanum source, the gadolinium source, and the cerium source comprise a co-precipitate of mixed (Y, La, Gd, Ce) phosphate.

16. The method of claim 9 wherein the yttrium source, the lanthanum source, the gadolinium source, and the cerium source comprise a mixed (Y, La, Gd, Ce) oxide co-precipitate.

17. The method of claim 9 wherein the phosphate source is diammonium hydrogen phosphate, ammonium dihydrogen phosphate, or boron phosphate.

* * * * *